United States Patent [19]

Lubin

[11] E Patent Number: Re. 31,814

[45] Reissued Date of Patent: Jan. 22, 1985

[54] THREE-PARTY CONFERENCE CIRCUIT FOR DIGITAL TIME-DIVISION-MULTIPLEX COMMUNICATION SYSTEMS

[75] Inventor: Barry D. Lubin, Schaumburg, Ill.

[73] Assignee: Motorola, Inc., Schaumburg, Ill.

[21] Appl. No.: 392,976

[22] Filed: Jun. 28, 1982

Related U.S. Patent Documents

Reissue of:

[64] Patent No.: 4,301,531
Issued: Nov. 17, 1981
Appl. No.: 54,391
Filed: Jul. 2, 1979

[51] Int. Cl.[3] ..... H04M 3/56

[52] U.S. Cl. ..... 370/62; 370/109

[58] Field of Search ..... 179/18 BC; 370/62, 109

[56] References Cited

U.S. PATENT DOCUMENTS

| | | | |
|---|---|---|---|
| 3,958,084 | 5/1976 | Nicholas | 179/18 BC |
| 4,054,757 | 10/1977 | LeJay | 179/18 BC |
| 4,076,966 | 2/1978 | Bovo et al. | 179/18 BC |
| 4,153,817 | 5/1979 | D'Ortenzio | 179/18 BC |
| 4,160,878 | 7/1979 | Hirschmann et al. | 179/18 BC |
| 4,190,744 | 2/1980 | Frank | 179/18 BC |

*Primary Examiner*—Thomas W. Brown
*Attorney, Agent, or Firm*—Rolland R. Hackbart; Edward M. Roney; James W. Gillman

[57] ABSTRACT

A three-party conference circuit provides for three-party conference calls in time-division-multiplex communication systems utilizing pulse-code modulation. The digitized speech signals from a selected group of channels are received from an incoming PCM highway, expanded from PCM coding to linear coding and consecutively stored in groups of three in three registers. Different pairs of the registers are selected by a multiplexer, after which the speech signals from the selected pairs of registers are added to provide a combined speech signal. The combined speech signals are compressed from linear coding to PCM coding and applied to an outgoing PCM highway for transmission to the respective parties. Since the speech signals are combined and retransmitted essentially within the same frame, time delay distortion of the audio signals is minimized. In addition, the three-party conference circuit provides for a diagnostic mode of operation where incoming speech signals are retransmitted and a broadcast mode of operation where the speech signals from one channel are combined with each of the other channels of the selected group of channels to be transmitted.

24 Claims, 8 Drawing Figures

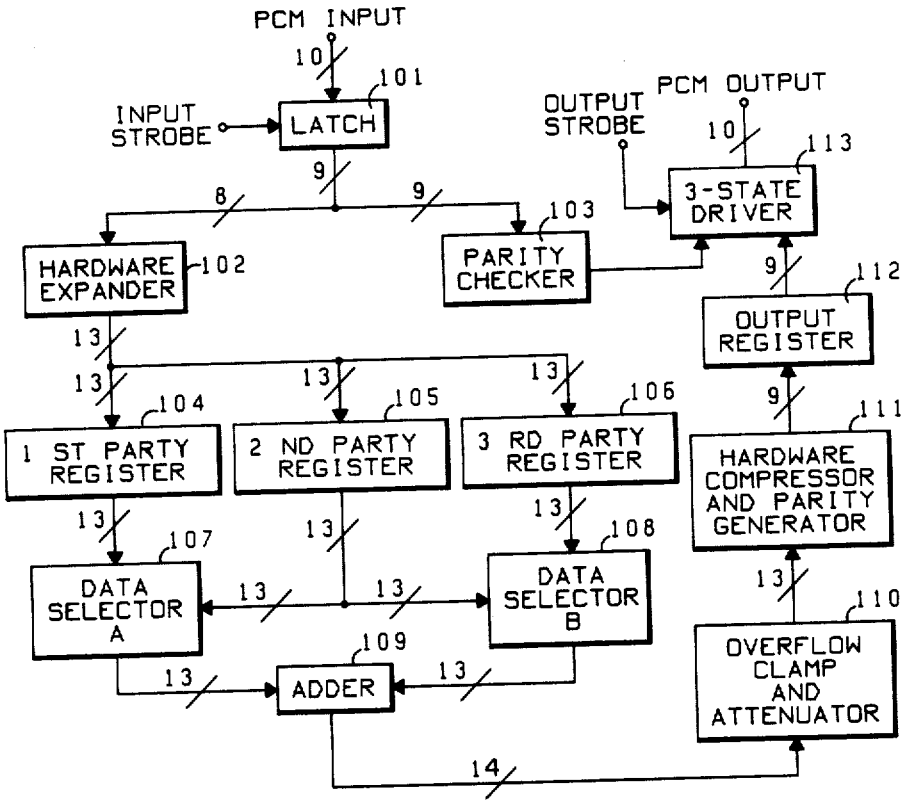
FIG. 1
FIG. 5
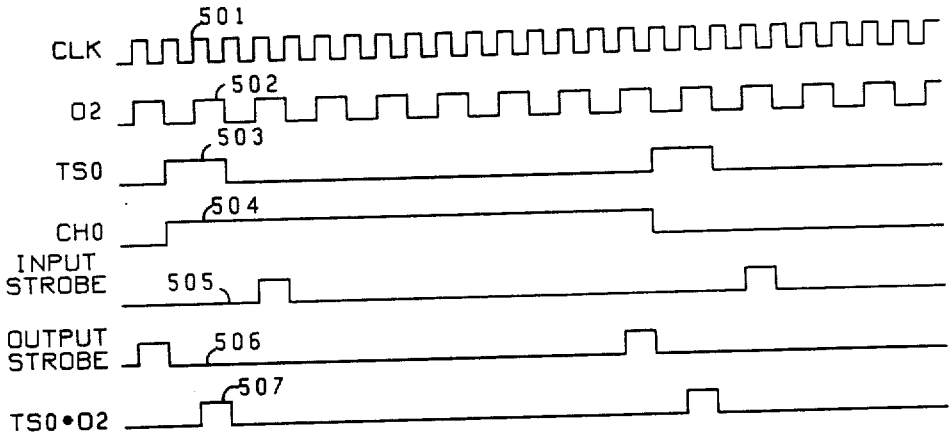

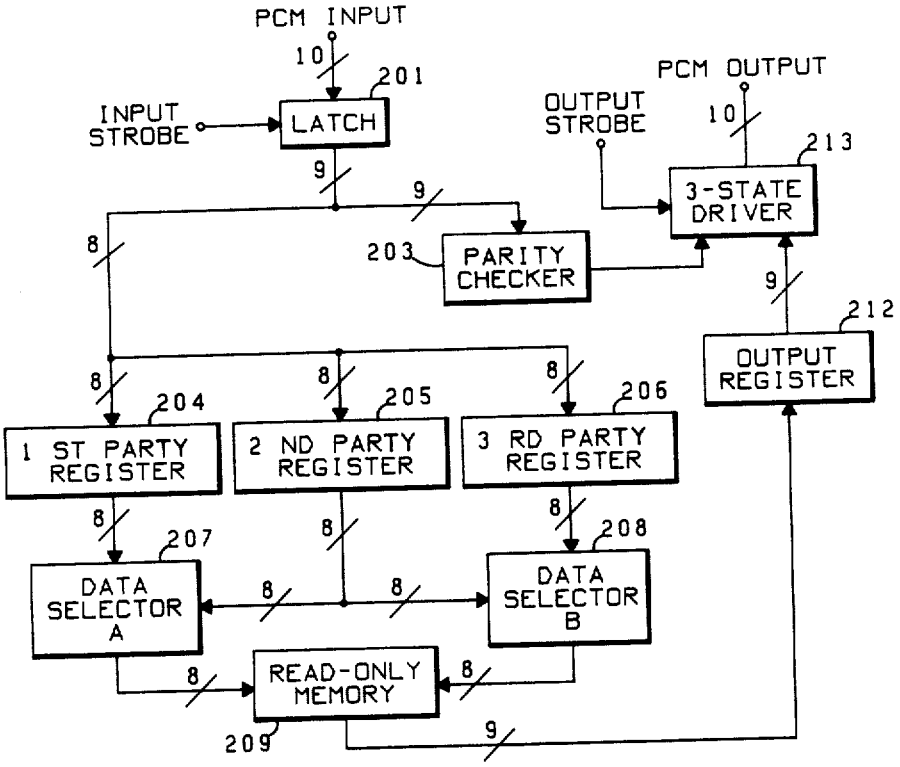
FIG. 2
FIG. 6
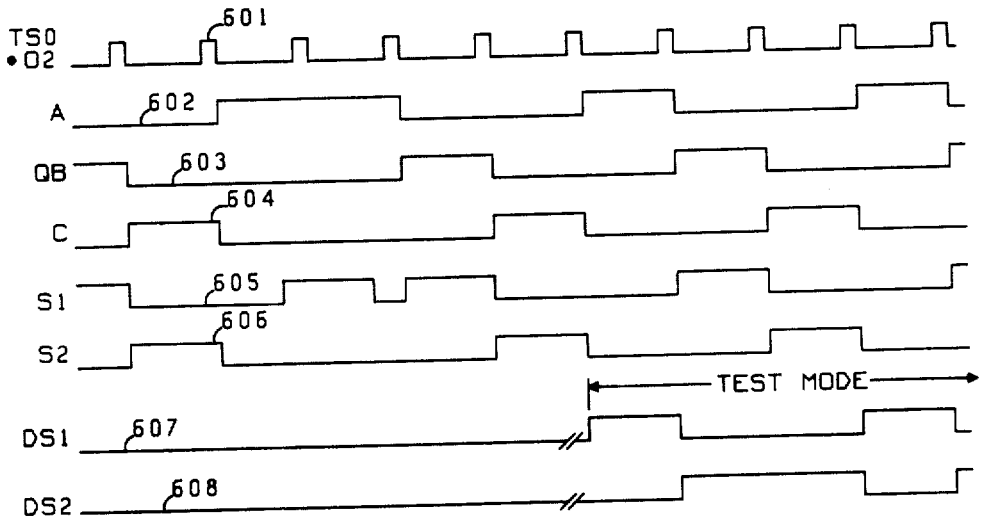

| CHANNEL NO. | MODE | | | CHANNEL NO. | MODE | | |
|---|---|---|---|---|---|---|---|
| | NORMAL | TEST | BROADCAST | | NORMAL | TEST | BROADCAST |
| 0 | 27+28 | 27 | 1+29 | 16 | 11+12 | 11 | 1+13 |
| 1 | 29+30 | 29 | 1+30 | 17 | 13+14 | 13 | 1+14 |
| 2 | 29+31 | 31 | 1+31 | 18 | 13+15 | 15 | 1+15 |
| 3 | 30+31 | 31 | 1+0 | 19 | 14+15 | 15 | 1+16 |
| 4 | 30+31 | 30 | 1+0 | 20 | 14+15 | 14 | 1+17 |
| 5 | 1+2 | 1 | 1+2 | 21 | 17+18 | 17 | 1+18 |
| 6 | 1+3 | 3 | 1+3 | 22 | 17+19 | 19 | 1+19 |
| 7 | 2+3 | 2 | 1+4 | 23 | 18+19 | 18 | 1+20 |
| 8 | 4+5 | 4 | 1+5 | 24 | 20+21 | 20 | 1+21 |
| 9 | 4+6 | 6 | 1+6 | 25 | 20+22 | 22 | 1+22 |
| 10 | 5+6 | 5 | 1+7 | 26 | 21+22 | 21 | 1+23 |
| 11 | 7+8 | 7 | 1+8 | 27 | 23+24 | 23 | 1+24 |
| 12 | 7+9 | 9 | 1+9 | 28 | 23+25 | 25 | 1+25 |
| 13 | 8+9 | 8 | 1+10 | 29 | 24+25 | 24 | 1+26 |
| 14 | 10+11 | 10 | 1+11 | 30 | 26+27 | 26 | 1+27 |
| 15 | 10+12 | 12 | 1+12 | 31 | 26+28 | 28 | 1+28 |

THREE-PARTY CONFERENCE CIRCUIT FOR DIGITAL TIME-DIVISION-MULTIPLEX COMMUNICATION SYSTEMS

Matter enclosed in heavy brackets [ ] appears in the original patent but forms no part of this reissue specification; matter printed in italics indicates the additions made by reissue.

BACKGROUND OF THE INVENTION

The present invention relates to digital time-division-multiplex (TDM) communication systems, and, more particularly, to multi-party conference circuits for providing multi-party telephone calls in digital TDM communication systems.

In digital TDM communication systems, samples of the speech signals are taken at a periodic rate, for example, 8 KHz, then quantized and time multiplexed onto channels of a digital highway in preassigned time intervals. The time interval between the taking of samples is commonly referred to as a frame. The number of channels allocated to a frame is dependent upon the particular type of TDM communication system utilized.

Most commercially available digital TDM communication systems utilize pulse-code modulation (PCM), the characteristics have been standardized by the CCITT in sections Q.46 and Q.47 of the Green Book, Volume 3, Section 7, entitled "Digital Transmissions Systems", published by the Fifth Plenary Assembly at Geneva, 1972. The two PCM formats specified by the CCITT are the 24-channel format wherein a frame contains 24 channels, and the 32-channel format, wherein a frame contains 32 channels. The digitized voice samples in these PCM systems are eight bits in length, and are derived according to non-linear companding codes, which are referred to as the $\mu$-law for the 24-channel format and the A-law for the 32-channel format. Groups of 24 channels for the 24-channel format or 32 channels for the 32-channel format may be time division multiplexed onto parallel TDM highways to facilitate processing within the digital switching portion of the PCM communication system.

In the digital switching network of these PCM communication systems, two-party conversations are readily provided by simply exchanging digitized speech signals between the respective two channels of the parties. However, problems arise when attempting to provide a multi-party conversation.

Various schemes for providing multi-party conference calls have been utilized in the prior art. For example, some prior art systems, such as those described in U.S. Pat. Nos. 3,699,264, 4,007,338, 4,022,981, 4,022,991, and 4,126,766, transmit to the other parties the speech signals from the party whose speech signal has the largest magnitude, or in other words, the party speaking the loudest. Other prior art systems, such as those described in U.S. Pat. Nos. 3,984,643, 4,109,111, and 4,119,807, essentially accumulate the sum of the speech signals from all parties during a frame, and then transmit to the parties a combined speech signal formed by subtracting the speech signal for the respective party from the accumulated sum of the speech signals for all parties. In yet other prior art systems, such as those described in U.S. Pat. Nos. 3,924,082, 4,054,757, and 4,059,735, the speech signals for a group of N parties are stored, after which combined speech signals for each different combination of N−1 parties are totallized and transmitted to the corresponding parties. Thus, the foregoing art systems either provide the loudest speaker to all parties; or over each frame, totallize and store the speech signals of all parties and then provide to each party the totallized speech signals less the respective party's contribution; or, over each multi-party grouping of channels, store the speech signals for all parties and then totallize the speech signals from the other N−1 parties for transmission to each party. In most of these prior art systems, a frame or more of time delay is introduced into the speech path, since the speech signals from all parties must first be stored before processing can be completed. Moreover, none of the prior art systems totallize the newly received speech signals and transmit the totallized speech signals to the corresponding parties in a time interval of less than one frame, without making use of an intermediate storage unit to accommodate speech signals of all N parties.

Accordingly, it is an object of the present invention to provide an improved three-party conference circuit for providing conference calls between groups of three parties, wherein the speech signals received from each party are combined and transmitted to the respective parties as they are received.

It is another object of the present invention to provide an improved three-party conference circuit for providing conference calls between groups of three parties, that may be advantageously utilized in various TDM communications systems having different channel capacities and different companding codes for digitizing speech signals.

It is yet another object of the present invention to provide an inexpensive three-party conference circuit for providing conference calls between groups of three parties, while also providing capability for converting between different companding laws, looping back speech signals for diagnostic purposes, and broadcasting a pre-selected channel in combination with all other channels of the frame.

SUMMARY OF THE INVENTION

In practicing the invention, a three-party conference circuit provides conference calls between groups of three parties whose digitized speech signals are carried in predetermined channels of an incoming TDM highway. The speech signals from consecutive three-channel groups are stored in first, second, and third registers, respectively. Different pairs of the registers are selected by a set of multiplexers and coupled to circuitry for combining the speech signals from each selected pair of registers. The combined speech signals from the combining circuitry are then applied to the outgoing TDM highway for transmission to the respective parties of the conference call.

BRIEF DESCRIPTION OF THE DRAWINGS

FIG. 1 is a block diagram of a three-party conference circuit embodying the present invention.

FIG. 2 is a block diagram of another embodiment of the three-party conference circuit of the present invention.

FIGS. 5, 6 and 7 illustrate waveforms of selected signals for various modes of operation of the three-party conference circuit of FIGS. 3 and 4.

FIG. 8 is a table that indicates the output which is provided by the three-party conference circuit for each output channel number depending on the particular mode of operation of the three-party conference circuit.

DETAILED DESCRIPTION OF THE PREFERRED EMBODIMENT

Figure 3:
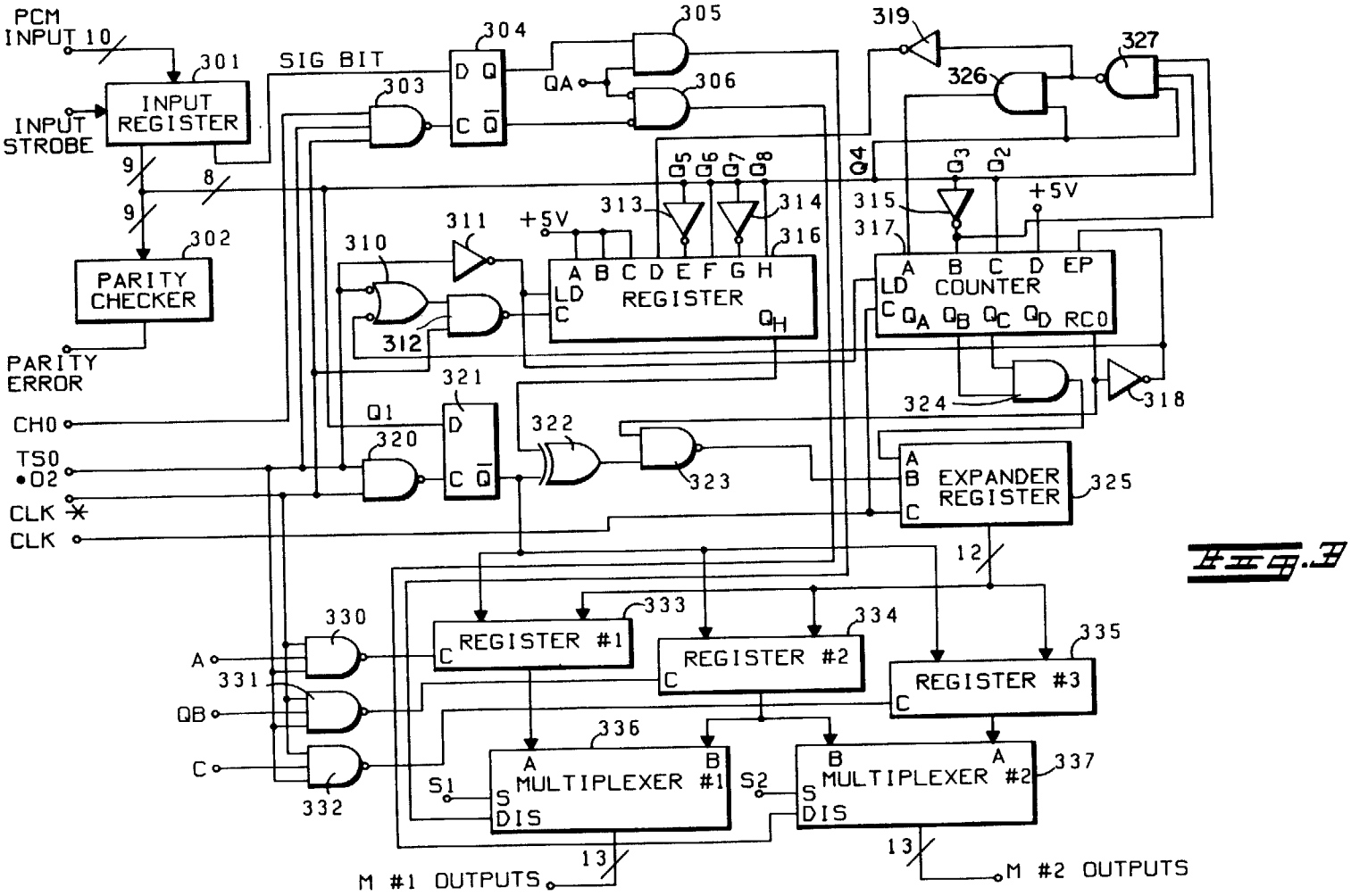
FIGS. 3 and 4 are a detailed block diagram of the three-party conference circuit of FIG. 1.

In FIG. 1, there is illustrated a three-party conference circuit embodying the present invention. The three-party conference circuit is advantageously adapted to be utilized in a TDM communications system, such as the PCM communication system described in U.S. patent application, Ser. No. 876,955, entitled "RADIO TELEPHONE COMMUNICATIONS SYSTEM" by Kevin M. Colosia, et al., filed Feb. 13, 1978, assigned to the instant assignee and now abandoned, and in U.S. patent application Ser. No. 72,875, entitled "A METHOD and APPARATUS for a RADIO TELEPHONE COMMUNICATION SYSTEM" by Richard I. Little, et al., assigned to the instant assignee and filed on Sept. 6, 1979 as a continuation-in-part of application Ser. No. 876,956, filed on Feb. 13, 1978 and now abandoned. In such a system, digitized speech signals are received from each channel in an incoming parallel TDM highway, interchanged and transmitted to each channel in an outgoing parallel TDM highway. During each frame, 16 groups of 32 channels in the case of the 32-channel format, or 24 channels in the case of the 24-channel format, are multiplexed to and from the incoming and outgoing parallel TDM highways, respectively. The three-party conference circuit of FIG. 1 is adapted to receive one group of the possible 16 groups of 32 or 24 channels. Thus, for the 32-channel format 30 of the 32 channels are voice channels and each three-party conference circuit may provide for up to ten three-party conference calls; and for the 24-channel format, each three-party conference circuit may provide up to eight three-party conference calls.

Referring specifically to FIG. 1, speech signals from each PCM channel are sequentially strobed into latch 101 from the incoming PCM highway by an input strobe signal (provided by other circuitry in the aforementioned patent applications). The speech signals for each channel include an eight bit speech word together with a parity bit and a signalling control bit, for a total of ten bits. Parity checker 103 regenerates the correct parity from the eight bit speech word and compares the regenerated parity bit with the received parity bit. The parity checker 103 provides a parity error signal if the received parity bit is not the same as the generated parity bit. The eight bit speech word from latch 101 is also applied to hardware expander 102. In TDM communications systems, the speech signals are generally digitized according to a companding code, such as the $\mu$-law or A-law companding codes. If the eight bit speech word is compressed according to one of these codes, the hardware expander 102 converts the eight bit compressed speech word into a linearized thirteen bit speech word so that successive speech words can be algebraically added.

Next, successive groups of three speech words are loaded into the first, second and third party registers 104–106, respectively. For example, channel 1 is loaded into first party register 104; channel 2 is loaded into second party register 105; and channel 3 is loaded into third party register 106. Data selectors 107 and 108 then couple different pairs of the three speech words stored in the registers 104–106 to the adder 109. The data selectors 107 and 108 first select registers 1 and 2, then registers 1 and 3, and last, registers 2 and 3. This particular order of selection is followed so that, after loading register 3 with the third speech word of a group of three speech words, register 1 may next be loaded with the first speech word of a succeeding group of three speech words. The foregoing operation minimizes the amount of delay introduced in providing the combined speech signals. Thus, the combined speech signals may be provided with a minimum delay of two channel time intervals.

Next, the selected pair of speech words are algebraically added by adder 109 to provide a combined speech word, which is then applied to overflow clamp and attenuator circuitry 110. Upon detection of a magnitude overflow, the overflow clamp and attenuator circuitry 110 will cause the magnitude of the combined speech signal to be limited to the maximum allowed level. Furthermore, if desired, magnitude attenuation by one-half or powers thereof may be readily provided by the overflow clamp and attenuator circuitry 110 simply by right shifting the combined speech word by one or more bits. The combined speech word is then applied to the hardware compressor and parity generator circuit 111, which compresses the thirteen bit linearized speech word into an eight bit compressed speech word together with the appropriate parity bit.

After compressing by the hardware compressor and parity generator circuit 111, the combined speech word and parity bit are loaded into output register 112. The combined speech word and parity bit from output register 112, together with the parity error signal from parity checker 103 are applied to the outgoing PCM highway by three-state driver 113 in response to an output strobe signal (provided by other circuitry in the aforementioned patent applications). The foregoing operation is then repeated for channels 4, 5 and 6, and for each following group of three consecutive channels.

Figures 7, 8:
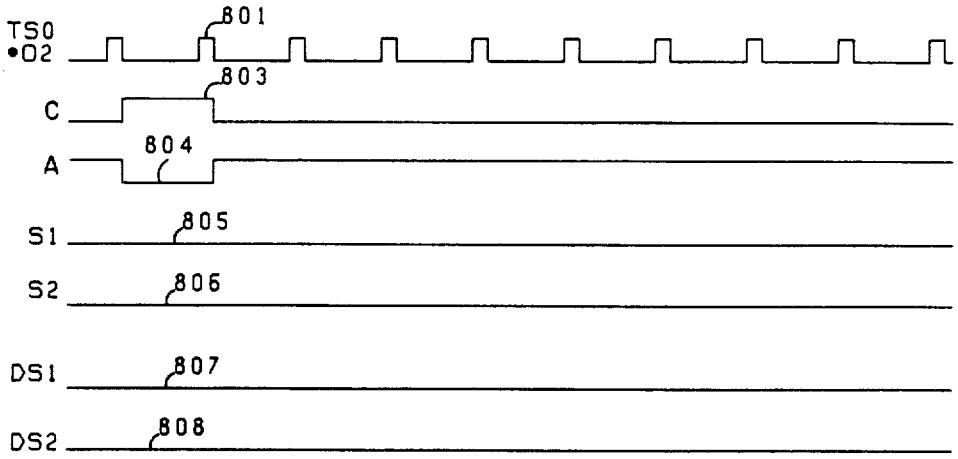

The table in FIG. 8 illustrates in the column labelled "normal mode", the order in which the speech words of the channels are combined for the 32-channel format. Since channel numbers 0 and 16 of the 32-channel format contain signalling control bits and not speech signals, the bits for these channels are ignored and the preceding combined speech word is repeated. The combined speech words for each conference call may then be routed by the digital TDM communication system, such as those in the aforementioned applications, to the appropriate party of each conference call. Interconnections are normally provided by such digital TDM communication systems by digitally interchanging the speech signals from each party in order to establish a two-party call. However, in providing a three-party call, the speech signals from each of the three parties are first routed to the three-party conference circuit, after which the combined speech signals from the three-party conference circuit may then be routed to the appropriate parties. As a result, an additional frame of delay, approximately 125 milliseconds, is introduced into the voice path between the respective parties of a three-party conference call. However, since a delay of 125 milliseconds is relatively small, the audio quality is not degraded. Furthermore, the conversation between the parties of a three-party conference call will not be noticeably affected by such a delay. However, the introduction of additional frame delays may become noticeable to the parties of a conference call if the accumulated delays exceed one-half second. In short, it is important to minimize the introduction of additional frame delays. Thus, an additional delay of approximately one frame is introduced in routing a three-party call via the three-party conference circuit of the present invention, whereas an additional delay of two or more frames is introduced in routing a three-party call via prior art conference circuits.

The three-party conference circuit of FIG. 1 may also be arranged as illustrated in FIG. 2. By utilizing read-only memory 209, it is possible to eliminate hardware expander 102, adder 109, overflow clamp and attenuator circuitry 110, and hardware compressor and parity generator circuitry 111 of FIG. 1. These blocks of FIG. 1 may be eliminated because the companded combined speech word for every possible pair of eight bit speech words may be stored in the read-only memory 209. Thus, each pair of eight bit speech words uniquely addresses a location in the read-only memory 209 where the combined speech word corresponding thereto is stored. In order to accommodate all of the possible combined speech words for two eight bit speech words, the read-only memory 209 would require 65,536 storage locations, each having 8 or 9 bits, depending on whether or not the parity bit is stored in the read-only memory 209 or generated externally therefrom.

The three-party conference circuit of FIG. 2 may be further simplified by eliminating the data selectors 207 and 208 and including three read-only memories 209, one for each different pair of registers 204–206. Moreover, various other configurations may be devised by those skilled in the art, depending on the price and availability of memory devices.

Figure 4:
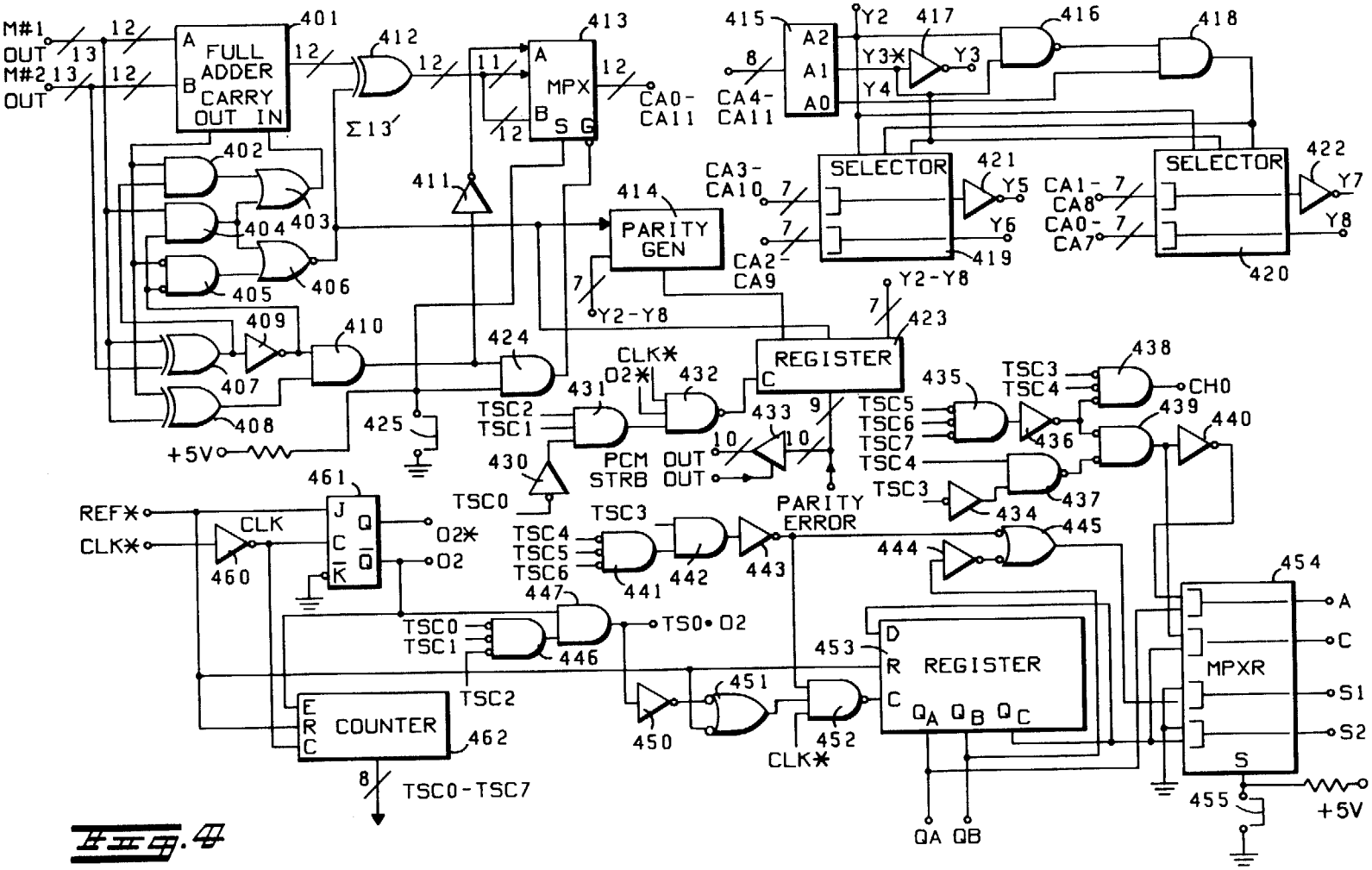

The detailed operation of the three-party conference circuit of the present invention may be better understood by reference to the detailed block diagrams of FIGS. 3 and 4. Referring to FIG. 3, successive speech words from the incoming PCM highway are strobed into input register 301 by an input strobe signal. One bit of the incoming PCM highway may provide a signalling control bit. The signalling control bit is coupled from input register 301 to flip-flop 304, which is clocked by NAND gate 303. The diagnostic test mode is provided when the signalling control bit has a logic high state in channel 0, resulting in the Q output of flip-flop 304 also having a logic high state.

The eight bits of the speech word plus the parity bit from input register 301 are applied to parity checker 302 which provides a parity error signal if the received parity bit is incorrect. The eight bit speech word from input register 301 is also applied to expander circuitry 310–327 for conversion from compressed to linear format. In the A-law format, even numbered magnitude bits Q2, Q4, Q6 and Q8 are transmitted with a logical inversion. By inverting the odd numbered magnitude bits Q3, Q5 and Q7, the seven inverted bits of the speech code and the sign bit approximates the transformation to the linear format as illustrated in Table I. where negative values are expressed as the 2's complement of the corresponding positive value. Ideally negative values are expanded as the 1's complement of the corresponding positive value. However 2's complement representation was selected for ease of implementation. The resulting error introduced with 1's complement addition is insignificant because low order bits have little effect on the subsequent compression transformation. The circuitry illustrated provides for expansion from the 32-channel A-law format to linearized format, according to the transformation illustrated in Table I. Expansion of companded voice signals is well known in the art and is described, for example, in the aforementioned CCITT Green Books, in the "MOTOROLA MCMOSS HANDBOOK", published by Motorola, Inc., 1974, at pages 10-6 through 10-20 and in an article by L. D. Crawforth, entitled "Second-Generation Toll-Quality PCM Carrier Terminal", published in the GTE Automatic Electric Technical Journal, Apr. 1972.

The speech word from input register 301 includes a sign bit Q1, a segment number, Q2, Q3 and Q4, and a level number within a segment, Q5, Q6, Q7 and Q8. The seven bit companded speech word is expanded into a 12 bit linear speech word, which is provided at the output of expander register 325. To perform the expansion, counter 317 is loaded with the segment number and register 316 is loaded with the level number within the segment. Counter 317 controls the shifting of register 316 and expander register 325 in order to properly locate the level number within the 12 bits of the expander register 325.

The sign bit, which is loaded into flip-flop 321, is loaded together with the 12-bit expanded speech word from expander register 325 into the appropriate register 333, 334, or 335, under control of the NAND gates 330, 331, and 332, respectively. The outputs from registers 333, 334, and 335 are then multiplexed by multiplexers 336 and 337 to full adder 401 on FIG. 4. An addition or 1's complement subtraction, is performed. The sign bits and carry out bit are coupled to gating logic 402–407 and 409 for providing the output sign bit and, via exclusive OR gates 412, complementing the output of the full adder 401 if the adder output is to be positive. This results in an inverted 12 bit magnitude. The sign bits and carry out bit are also applied to gating circuitry 407–410 for detecting an overflow and via NAND gate 424 forcing the outputs of multiplexer 413 to zero when jumper 425 is not present. Also, when jumper 425 is not present, the select line to multiplexer 413 has a logical high state, which causes multiplexer 413 to select the B inputs, which are the 12 outputs from the full adder 401 via exclusive OR gates 412. Otherwise, if jumper 425 is present, an attenuation of 6 dB is provided by enabling multiplexer 413 to select the A inputs, which are the outputs of full adder 401 coupled via exclusive OR gate 412 and shifted to the right by one bit. Also, when jumper 425 is present, AND gate 424 is disabled and the overflow output from AND gate 410 is coupled to the high order input of multiplexer 413 via inverting gate 411.

Next, the combined speech words from full adder 401 must be compressed before application to the output register 423. The sign bit from NAND gate 406 is applied directly to output register 423, providing the high order bit Y1. The compressing circuitry includes a priority encoder 415 and data selectors 419 and 420. The eight high order bits from multiplexer 413 are applied to priority encoder 415 for generating the segment number, Y2, Y3 and Y4. The segment number, Y2, Y3 and Y4, is applied to the address inputs of data selectors 419 and 420 for deriving the level number, Y5, Y6, Y7 and Y8. The segment numbers Y2, Y3 and Y4 and corresponding level number Y5, Y6, Y7 and Y8 are generated according to the transformation illustrated in Table I with proper alternating bit inversions, as previously mentioned. The segment number, Y2, Y3 and Y4, and the level number within the segment, Y5, Y6, Y7 and Y8, together with the sign bit Y1 and parity bit from parity generator 414, are then loaded into output register 423. The outputs from output register 423 together with the parity error signal from the parity checker 302 of FIG. 3 are coupled to three-state drivers 433 for application to the outgoing PCM highway in response to an output strobe signal.

The remaining blocks of FIG. 4 generate the necessary timing and control signals, whose waveforms are illustrated in FIGS. 5 and 6, for controlling the operation of the three-party conference circuitry. An external clock signal, CLK*, having a nominal frequency of 4.096 MHz for the 32-channel format is applied to flip-flop 461 via inverting gate 460. Flip-flop 461 divides the clock signal by two to provide output signals O2 and O2*. Also applied to flip-flop 461 and counter 462 is an external reference signal, REF*, providing a momentary pulse at the beginning of each superframe. The reference signal insures that each module in a digital TDM communication system is synchronized to the beginning of each superframe, where, for the 32-channel format, successive groups of 16 frames are formatted into superframes for accommodating supervisory signalling. The CLK and O2 signals are illustrated by waveforms 501 and 502, respectively, in FIG. 5.

Counter 462 provides timing signals, TSC0 through TSC7, which are further utilized to provide various timing intervals for controlling the operation of the three-party conference circuit. The channel zero time interval, CH0 is provided at the output of gate 438 and is illustrated by waveform 504 in FIG. 5. During successive channel time intervals, speech words are strobed from the incoming PCM highway into the input register 301 by the incoming strobe signal illustrated by waveform 505 in FIG. 5 for the CH0 and CH1 time intervals. Also during successive channel time intervals, combined speech words are strobed onto the outgoing PCM highway by the outgoing strobe signal illustrated by waveform 506 in FIG. 5 for the CH0 and CH1 time intervals. Each channel time interval may be subdivided into eight smaller intervals, TS0 through [TS8] *TS7*. The first subinterval TS0, provided by NOR gate 446 and illustrated by waveform 503 of FIG. 5, is ANDed with O2 via gate 447 to provide the signal, TS0.O2, which controls the clocking of register 453, flip-flops 304 and 321 and the loading of registers 316, 333–335, and counter 317.

Register 453 and multiplexer 454 provide the signals for controlling the operation of registers 333–335 and multiplexers 336 and 337. Register 453 is operated as a three-stage ring counter, where outputs QA, QB, and QC essentially control the loading of registers 333, 334 and 335, respectively. In the normal mode of operation, the select control line to multiplexer 454 is a logical one, and the waveforms for the signals provided by multiplexer 454 are those illustrated in FIG. 6. The waveforms A, QB and C, 602, 603 and 604, respectively control the loading of registers 333, 334 and 335, respectively, on FIG. 3. The waveforms S1 and S2, 605 and 606 respectively control the select line to multiplexers 336 and 337, respectively, also on FIG. 3. The waveforms DS1 and DS2, 607 and 608, respectively control the disable line of multiplexers 336 and 337, respectively, also on FIG. 3. The waveforms DS1 and DS2, 607 and 608, are normally a logical zero and thus have no effect on the output of the multiplexers 336 and 337. In the test mode, the waveforms DS1 and DS2 607 and 608 are alternately enabled so that one of the multiplexers is disabled. Since the disabled multiplexer provides an output which has an all zero value, the output of the other multiplexer is added to an all zero value, resulting in the looping back of each speech word in the test mode.

When jumper 455 is present, the waveforms of the signals from multiplexer 454 are those illustrated in FIG. 7 for providing the broadcast mode of operation. The waveforms for S1 and S2, 805 and 806, respectively have a logical zero state for enabling multiplexers 336 and 337 to continuously select register number 1(333) and register number 3(335). The waveforms DS1 and DS2 807 and 808 are typically held at a logical zero value during this mode of operation. The waveform C, 803 is a logical one only momentarily to load the voice word from channel one into register number 3(335). At all other times, the waveform A, 804 is at a logical one such that the speech words for all other channels are loaded into register number 1(333). Thus, the speech words from all channels are added to the speech word from channel number 1 to provide the broadcast mode of operation. The combined speech words provided by the three-party conference circuit for each channel number are illustrated in the table of FIG. [7] *8* for the various modes of operation.

The circuitry comprising the three-party conference circuit illustrated in FIGS. 3 and 4 may be implemented with conventional integrated circuit logic devices, such as those described in the "TTL Data Book for Design Engineers", published by Texas Instruments, Inc., 1976.

It is clear that the blocks of FIG. 4 that generate the necessary timings and control signals may readily be modified to operate in a 24 channel per frame environment, and one skilled in the art may in fact design a timing and control circuit with a strappable option to operate in either the 24 or 32 channel mode.

Likewise, by observing the similarities in the A-law and $\mu$-law transformations in Table I, one skilled in the art may design a compressing circuit and an expanding circuit, each with an independent strappable option for A-law or $\mu$-law operation. With this feature, by operating the timing and control signals in the test mode, and by operating the expander and compressor in different companding laws, a companding code conversion is achieved for every channel of the frame.

In summary, a novel three-party conference circuit has been described which provides for conference calls between three parties, while also providing for a diagnostic test mode and a broadcast mode of operation. The three-party conference cicuit sums the speech signals from each different pair of parties in the three-party call, and essentially immediately transmits the combined speech signals back to the respective parties. Furthermore, the three-party conference circuit of the present invention may be inexpensively built entirely from digital integrated circuit devices. Since the three-party conference circuit may be realized entirely with digital circuitry, the three-party conference circuit may also be integrated into a semiconductive substrate and packaged as a single integrated circuit device.

TABLE I

Companding Code Transformation

| Sign Bit | Compressed Code | Sign Bit | A-Law Expanded | $\mu$-Law Expanded |
|---|---|---|---|---|
| 1 | $111\overline{W}\overline{X}\overline{Y}\overline{Z}$ | 0 | 0000000WXYZ1 | 00000001WXYZ |
| 1 | $110\overline{W}\overline{X}\overline{Y}\overline{Z}$ | 0 | 0000001WXYZ1 | 0000001WXYZ1 |
| 1 | $101\overline{W}\overline{X}\overline{Y}\overline{Z}$ | 0 | 000001WXYZ10 | 000001WXYZ10 |
| 1 | $100\overline{W}\overline{X}\overline{Y}\overline{Z}$ | 0 | 00001WXYZ100 | 00001WXYZ100 |
| 1 | $011\overline{W}\overline{X}\overline{Y}\overline{Z}$ | 0 | 0001WXYZ1000 | 0001WXYZ1000 |

TABLE I-continued

| Sign Bit | Compressed Code | Sign Bit | A-Law Expanded | μ-Law Expanded |
|---|---|---|---|---|
| | | Companding Code Transformation | | |
| 1 | 010$\overline{W}\overline{X}\overline{Y}\overline{Z}$ | 0 | 001WXYZ10000 | 001WXYZ10000 |
| 1 | 001$\overline{W}\overline{X}\overline{Y}\overline{Z}$ | 0 | 01WXYZ100000 | 01WXYZ100000 |
| 1 | 000$\overline{W}\overline{X}\overline{Y}\overline{Z}$ | 0 | 1WXYZ1000000 | 1WXYZ1000000 |
| 0 | 111$\overline{W}\overline{X}\overline{Y}\overline{Z}$ | 1 | 1111111WXYZ1 | 11111110WXYZ |
| 0 | 110$\overline{W}\overline{X}\overline{Y}\overline{Z}$ | 1 | 111111$\overline{W}\overline{X}\overline{Y}\overline{Z}$1 | 111111$\overline{W}\overline{X}\overline{Y}\overline{Z}$1 |
| 0 | 101$\overline{W}\overline{X}\overline{Y}\overline{Z}$ | 1 | 11111$\overline{W}\overline{X}\overline{Y}\overline{Z}$10 | 11111$\overline{W}\overline{X}\overline{Y}\overline{Z}$10 |
| 0 | 100$\overline{W}\overline{X}\overline{Y}\overline{Z}$ | 1 | 1111$\overline{W}\overline{X}\overline{Y}\overline{Z}$100 | 1111$\overline{W}\overline{X}\overline{Y}\overline{Z}$100 |
| 0 | 011$\overline{W}\overline{X}\overline{Y}\overline{Z}$ | 1 | 111$\overline{W}\overline{X}\overline{Y}\overline{Z}$1000 | 111$\overline{W}\overline{X}\overline{Y}\overline{Z}$1000 |
| 0 | 010$\overline{W}\overline{X}\overline{Y}\overline{Z}$ | 1 | 11$\overline{W}\overline{X}\overline{Y}\overline{Z}$10000 | 11$\overline{W}\overline{X}\overline{Y}\overline{Z}$10000 |
| 0 | 001$\overline{W}\overline{X}\overline{Y}\overline{Z}$ | 1 | 1$\overline{W}\overline{X}\overline{Y}\overline{Z}$100000 | 1$\overline{W}\overline{X}\overline{Y}\overline{Z}$100000 |
| 0 | 000$\overline{W}\overline{X}\overline{Y}\overline{Z}$ | 1 | 0$\overline{W}\overline{X}\overline{Y}\overline{Z}$1000000 | 0$\overline{W}\overline{X}\overline{Y}\overline{Z}$1000000 |

I claim:

I claim:

1. A conference circuit for combining digitized speech signals received from groups of three parties in corresponding *consecutive* channels of an incoming time-division-multiplex (TDM) highway, having a predetermined number of channels, to provide combined speech signals for transmission to the parties in corresponding *consecutive* channels of an outgoing TDM highway, having a predetermined number of channels, said conference circuit comprising:

first, second and third register means [repetitively] *sequentially* coupled one after another to the incoming TDM highway for storing [the] *different* speech signals from [every third channel] *successive groups of three channels;* multiplexing means coupled to the first, second and third register means for *sequentially* selecting *the speech signals in* different pairs of the register means, said multiplexing means selecting the *speech signals in the* [second ] *first* and [third] *second* register means [when] *after* speech signals *of the first two channels in a group of three channels* are [being] stored in the [first] *the* [first] *second* and third register means [when] *after* speech signals *of the first channel in the next group of three channels* are [being] stored in the [second] *first* register means;

means for combining the speech signals from each selected pair of register means; and means for applying the combined speech signals to *consecutive channels of* the outgoing TDM highway.

2. The three-party conference circuit according to claim 1, wherein the digital speech signals for each channel are compressed according to a predetermined companding code, said conference circuit further including means interposed between the incoming TDM highway and the first, second and third register means for expanding the compressed speech signals, and means interposed between the combining means and the applying means for compressing the combined speech signals.

3. The three-party conference circuit according to claim 1, wherein the combining means includes binary adding means for combining the speech signals from each selected pair of register means, and attenuating means for serially shifting the combined speech signals by one bit position for attenuating the magnitude thereof by a factor of substantially one-half.

4. The three-party conference circuit according to claim 2, further including an input buffer register interposed between the incoming TDM highway and the expanding means, and output buffer means interposed between the compressing means and the applying means.

5. The three-party conference circuit according to claim 1 or 2, wherein the combining means comprises memory means for storing for each pair of speech signals a combined speech signal at a location therein addressed by the pair of speech signals, said memory means responsive to the speech signals from each selected pair of register means for reading out the stored combined speech signal from the memory location addressed by the speech signals from the selected pair of register means.

6. The three-party conference circuit according to claim 1, wherein a control bit is provided together with [the speech signals in] *each speech signal in each channel of* the incoming TDM highway, and said three-party conference circuit further includes means coupled to the incoming TDM highway for receiving the control [bit] *bits*, said multiplexing means responsive to a predetermined logical state of the received control [bit] *bits* for individually selecting the first, second and third register means and pairing the speech signals of each selected register means with a speech signal having a magnitude value of zero.

7. The three-party conference circuit according to claim 6, wherein the digital speech signals for each channel in the incoming TDM highway are compressed according to a predetermined first companding code and the digital speech signals for each channel in the outgoing TDM highway are compressed according to a predetermined second companding code, said conference circuit further including means interposed between the incoming TDM highway and the first, second and third register means for expanding the speech signals compressed according to the predetermined first companding code, and means interposed between the combining means and the applying means for compressing the combined speech signals according to the predetermined second companding code.

8. The three-party conference circuit according to claim 1, further including means for providing an input control signal having predetermined first and second states, and control means responsive to the predetermined first state of the input control signal for enabling a first pre-selected one of the first, second and third register means to receive the speech signals of a predetermined channel from the incoming TDM highway and enabling a second pre-selected one of the first, second and third register means to sequentially receive the speech signals of the other channels from the incoming TDM highway, said multiplexing means responsive to the predetermined first state of the input control signal for selecting said first preselected one and said second preselected one of the first, second and third register means.

9. The three-party conference circuit according to claim 1 further including means for selectively coupling combined speech signals from the outgoing PCM highway back to the incoming PCM highway for providing multi-party conference calls.

10. The three party conference circuit according to claim 1, further including means interposed between the combining means and the applying means for providing a combined signal with a predetermined maximum magnitude to the applying means when detecting combined speech signals having a magnitude greater than a predetermined magnitude.

11. A conference circuit for combining digitized speech signals received from groups of three parties in corresponding *consecutive* channels of an incoming time-division-multiplex (TDM) highway, having a predetermined number of channels, to provide combined speech signals for transmission to the parties in corresponding *consecutive* channels of an outgoing TDM highway, having a predetermined number of channels, said conference circuit comprising: first, second and third register means [repetitively] *sequentially* coupled one after another to the incoming TDM highway for storing [the] *different* speech signals from [every third channel] *successive groups of three channels;* memory means for storing three combined speech signals representative of the [combination] *combinations* of each *different* pair of three speech signals at a location therein addressed by the three speech signals, said memory means responsive to the three speech signals [from] *for each group of three channels stored in* the first, second and third register means for reading out the three stored combined speech signals from the memory location addressed by the three speech signals from the first, second and third register means; and means for applying *each of* the three read-out combined speech signals to *corresponding consecutive channels of* the outgoing TDM highway.

12. The three-party conference circuit according to claim 11, wherein the first, second and third register means each store a predetermined number of bits, the memory means being responsive to predetermined bits of the first, second and third register means.

13. The three-party conference circuit according to claim 11, wherein the memory means includes three read-only memories each coupled to a different pair of speech signals from the first, second and third memory means.

14. The three-party conference circuit according to claim 11, 12, or 13, wherein the speech signals in the incoming TDM highway are digitized and compressed according to a predetermined companding code, said memory means storing three compressed combined speech signals representative of the combination of each pair of three compressed speech signals from the first, second and third register means.

*15. A conference circuit for combining digitized speech signals received from groups of three parties in corresponding consecutive channels of an incoming time-division-multiplex (TDM) highway, having a predetermined number of channels, to provide combined speech signals for transmission to the parties in corresponding consecutive channels of an outgoing TDM highway, having a predetermined number of channels, said conference circuit comprising:*

*first, second and third register means sequentially coupled one after another to the incoming TDM highway for storing different speech signals from successive groups of three channels;*

*multiplexing means coupled to the first, second and third register means for sequentially selecting different pairs of the register means after speech signals have been stored therein, said multiplexing means first selecting the first and second register means, next the first and third register means, and last the second and third register means;*

*means for combining the speech signals from each selected pair of register means; and*

*means for applying the combined speech signals to consecutive channels of the outgoing TDM highway.*

*16. The three-party conference circuit according to claim 15, wherein the digital speech signals for each channel are compressed according to a predetermined companding code, said conference circuit further including means interposed between the incoming TDM highway and the first, second and third register means for expanding the compressed speech signals, and means interposed between the combining means and the applying means for compressing the combined speech signals.*

*17. The three-party conference circuit according to claim 16, wherein the combining means includes binary adding means for combining the speech signals from each selected pair of register means, and attenuating means for serially shifting the combined speech signals by one bit position for attenuating the magnitude thereof by a factor of substantially one-half.*

*18. The three-party conference circuit according to claim 16, further including an input buffer register interposed between the incoming TDM highway and the expanding means, and output buffer means interposed between the compressing means and the applying means.*

*19. The three-party conference circuit according to claim 15 or 16, wherein the combining means comprises memory means for storing for each pair of speech signals a combined speech signal at a location therein addressed by the pair of speech signals, said memory means responsive to the speech signals from each selected pair of register means for reading out the stored combined speech signal from the memory location addressed by the speech signals from the selected pair of register means.*

*20. The three-party conference circuit according to claim 15, wherein a control bit is provided together with each speech signal in each channel of the incoming TDM highway, and said three-party conference circuit further includes means coupled to the incoming TDM highway for receiving the control bits, said multiplexing means responsive to a predetermined logical state of the received control bits for individually selecting the first, second and third register means and pairing the speech signals of each selected register means with a speech signal having a magnitude value of zero.*

*21. The three-party conference circuit according to claim 20, wherein the digital speech signals for each channel in the incoming TDM highway are compressed according to a predetermined first companding code and the digital speech signals for each channel in the outgoing TDM highway are compressed according to a predetermined second companding code, said conference circuit further including means interposed between the incoming TDM highway and the first, second and third register means for expanding the speech signals compressed according to the predetermined first companding code, and means interposed between the combining means and the applying means for compressing the combined speech signals according to the predetermined second companding code.*

*22. The three-party conference circuit according to claim 15, further including means for providing an input control signal having predetermined first and second states and control means responsive to the predetermined first state of the input control signal for enabling a first pre-selected one of the first, second and third register means to receive the speech signals of a predetermined channel from the incoming TDM highway and enabling a second pre-selected one of the first, second and third register means to sequentially receive the speech signals of the other channels from the incoming TDM highway, said multiplexing means responsive to the predetermined first state of the input control signal for selecting said first preselected one and said sec-*

*ond preselected one of the first, second and third register means.*

*23. The three-party conference circuit according to claim 15 further including means for selectively coupling combined speech signals from the outgoing PCM highway back to the incoming PCM highway for providing multi-party conference calls.*

*24. The three party conference circuit according to claim 15, further including means interposed between the combining means and the applying means for providing a combined signal with a predetermined maximum magnitude to the applying means when detecting combined speech signals having a magnitude greater than a predetermined magnitude.*

* * * * *